United States Patent [19]

Herbst et al.

[11] 4,142,175

[45] Feb. 27, 1979

[54] PRESSURE SENSING DEVICE AND TRANSDUCER ARRANGEMENT

[75] Inventors: Noel M. Herbst, Mount Kisco; Chao N. Liu, Yorktown Heights; Hugo A. Panissidi, Peekskill, all of N.Y.

[73] Assignee: International Business Machines Corporation, Armonk, N.Y.

[21] Appl. No.: 914,651

[22] Filed: Jun. 12, 1978

[51] Int. Cl.$^2$ .............................................. G01L 5/16
[52] U.S. Cl. .......................... 340/146.3 SY; 73/141 A; 73/432 R
[58] Field of Search ............ 340/146.3 SY; 73/141 A, 73/1 B, 4 R, 100, 89, 432 R, 37, 39; 274/23 R

[56] References Cited

U.S. PATENT DOCUMENTS

| | | | |
|---|---|---|---|
| 3,528,295 | 9/1970 | Johnson et al. | 73/432 R |
| 3,563,097 | 2/1971 | Roggenstein et al. | 73/432 R |
| 3,621,720 | 11/1971 | Clark | 340/146.3 SY |
| 3,792,240 | 2/1974 | Stumpo | 340/146.3 SY |
| 3,808,408 | 4/1974 | Given et al. | 340/146.3 SY |
| 3,835,453 | 9/1974 | Narayanan | 340/146.3 SY |
| 3,906,444 | 9/1975 | Crane et al. | 340/146.3 SY |
| 3,915,015 | 10/1975 | Crane et al. | 73/432 R |
| 4,006,628 | 2/1977 | St. Jacques | 73/432 R |

*Primary Examiner*—Leo H. Boudreau
*Attorney, Agent, or Firm*—Roy R. Schlemmer, Jr.

[57] ABSTRACT

A pressure sensing device having applicability as a simple pressure sensor and which is particularly adapted for use as a pen in a Signature Verification System, said device including a unique mounting structure for the pressure sensing stylus by flexible support means mounted on a substantially rigid base. The support means has a pressure sensing element mounted thereon. The flexible support means comprises two spaced members so disposed that their deflections and the output of the pressure sensing element are substantially independent of the angle of pressure on the stylus. In the special purpose embodiment useful for Signature Verification the stylus comprises a pen and the device further includes two orthogonally disposed accelerometers for sensing accelerations of said pen during the writing of a signature.

9 Claims, 6 Drawing Figures

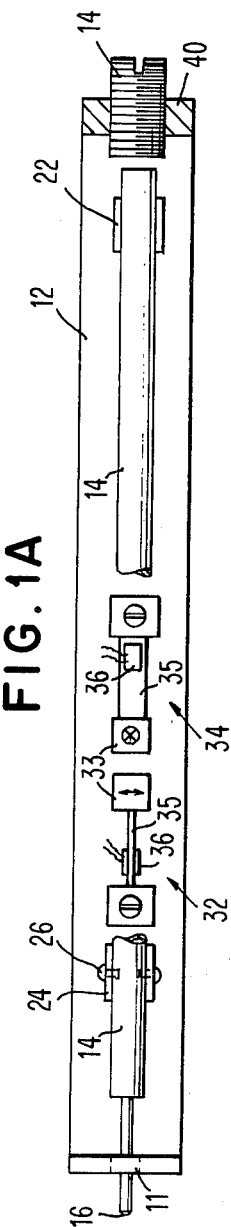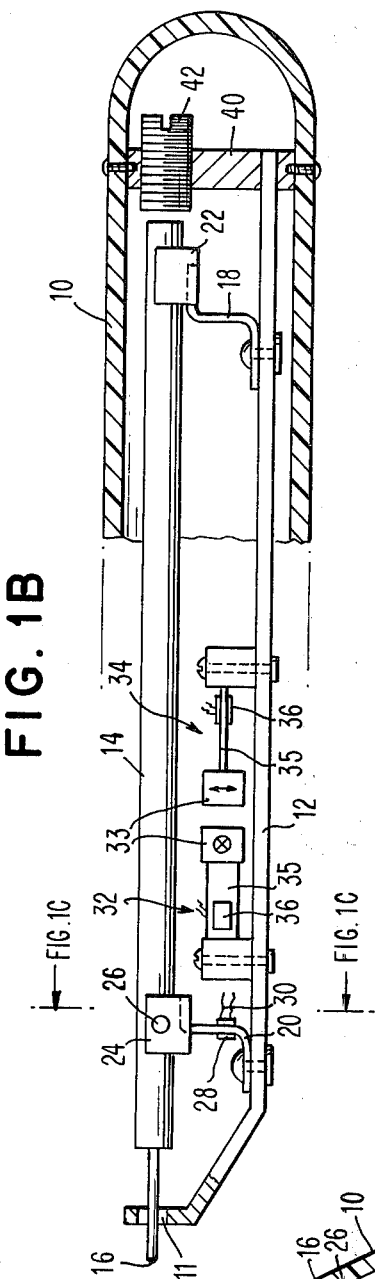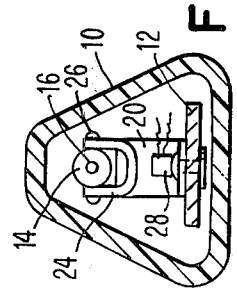

PRESSURE SENSING DEVICE AND TRANSDUCER ARRANGEMENT

DESCRIPTION

Technical Field

The present invention relates generally to the area of pressure sensitive pickup or detection devices wherein such devices may be utilized to detect or monitor a change in pressure between the device and some surface which it may contact. A particularly useful application for such devices is in the field of Signature Verification wherein it is desired that the identity of an unknown person be unequivocally established by means of comparing his signature with a previous known signature. Concepts of the present invention may be utilized in a special pen configuration for use in such a system wherein means are provided in said pen for producing a signal proportional to the stylus pressure on a writing surface. Such a pen configuration may further include means for concurrently producing signals representative of two orthogonally disposed acceleration vectors produced by the motion of the pen in writing a signature.

It is a primary object of the present invention to provide a pressure sensing probe assembly wherein the magnitude of the pressure signal is substantially independent of whether the pressure is applied axially or transverse to the probe tip.

A still further object of the invention is to provide a general mechanism for measuring probing pressures making constructive use of the deflections inherent in the structure, which is of use in various automatic probing and/or edge following devices.

Another object of the present invention is the provision of a special pen configuration utilizing the concepts disclosed herein wherein the magnitude of the pressure signal is substantially independent of the pen orientation with respect to the writing surface.

It is a further object of the invention to provide a unique mounting structure for the actual writing stylus within the probe or pen assembly whereby said pressure signal is produced by a suitably supported sensor element.

The ever increasing use of credit and electronic funds transfer operations in the present day financial community including the retail industry, securities industry, banking, etc., where substantial sums of money and/or materials are transferred based on the reliance on a particular person's identity, places ever increasing demands on methods of assuring reliably, that a given person's identity can be verified. Verifying a person's identity by means of comparing his signature with a previous signature made under totally controlled conditions and known to be authentic has long been considered one of the best means for positive identification of a person. However, as is well known, expert forgers have often illegally penetrated such Signature Verification Systems which conventionally comprise visual comparison of the known signature with a putative signature. Despite its wide use, signature verification utilizing the visual comparison of two signatures is not certain even when carried out by expert document examiners.

Recent developments in automatic Signature Verification Systems such as exemplified by U.S. Pat. No. 3,983,535 of N. M. Herbst and J. H. Morrissey, and U.S. patent application Ser. No. 866,190 filed Dec. 27, 1978 of N. M. Herbst and C. N. Liu provide systems which render the whole concept of personal identification via signature techniques practical. In the first of these patents a system is disclosed which utilizes acceleration data as the whole criteria for accepting or rejecting the signature as valid. The second patent discloses a system which utilizes both acceleration data and continuous pressure data as the system input signals which are compared as between a known and a putative signature. Reference should be made to these patents for a description of specific system configurations.

Background Art

In the system disclosed in U.S. patent application Ser. No. 866,190 of N. M. Herbst and C. N. Liu, the analysis of continuous pressure patterns resulted in a significant performance improvement over the system of U.S. Pat. No. 3,983,535. The pen utilized for the development of both acceleration and pressure signals in, U.S. patent specification Ser. No. 866,190 of N. M. Herbst and C. N. Liu utilized an axially mounted pressure-sensitive strain gauge or sensor which produced a signal proportional to the axial pressure on the stylus during the signature operation. It was found, however, that the pressure patterns from this pen were inconsistent and irregular, especially when the pen was held at an acute angle to the paper during the writing of the signature. It was concluded that an improved pen design was needed whereby a pressure-sensitive transducer could be mounted within the pen to produce an output signal substantially independent of the angle of the pen with respect to the writing surface.

BRIEF DESCRIPTION OF DRAWINGS

FIGS. 1A 1B, and 1C comprise top, side and cross sectional views respectively of a special purpose pen incorporating the features of the present invention illustrating the mounting of the writing stylus and the respective signal producing transducers located therein.

DISCLOSURE OF INVENTION

Figure 2:
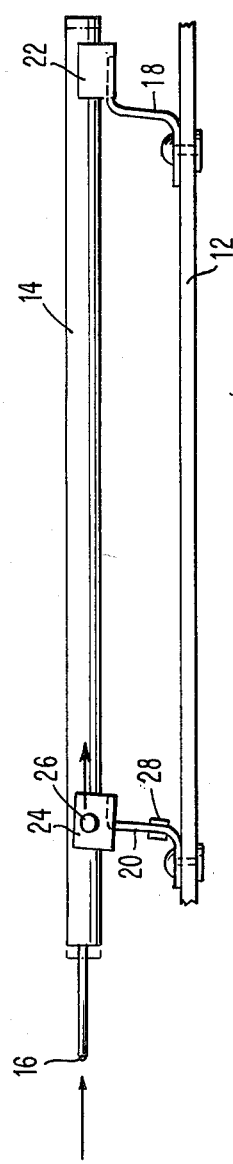
FIG. 2 is a side view of the pressure sensing components in the pen structure illustrating the deformation of the stylus mounting means when an axial pressure is applied to the writing stylus.

It has now been found that an improved pressure sensing structure may be realized by configuring the structure such that the stylus is mounted within the main body on a rigid frame via resilient mounting means whereby, when pressure is applied to said stylus during the writing of a signature or pressure sensing operation, a slight bending or flexing of said mounting means is caused due to either axial pressure on said stylus tip or lateral pressure applied to said stylus tip at an angle with respect to said stylus axis. The flexing of this resilient member is in turn detected by a sensor such as a strain gauge, located thereon and a resultant electrical signal is produced proportional to the flexing which is in turn a function of the pressure applied.

More particularly, in a pen configuration, the writing stylus comprises an elongated flexible member such as, for example, a standard ball-point pen cartridge. The resilient mounting means comprises two resilient spring members mounted at either end of said writing stylus. The resilient member adjacent to the point or writing end is rigidly attached to the frame or base and pivotally connected to the stylus. The resilient support member at the opposite end of said stylus is rigidly attached to both the stylus and the base member. The strain gauge is fixedly mounted on said resilient support member, adjacent to said writing tip, as close to the frame as possible whereby any deformation of said resilient member in the region of maximum strain will cause an electrical signal or electrical perturbation to be produced substantially proportional to the amount of said deformation. As a result of this configuration a given pressure applied to said stylus either axially or transverse thereto will produce electrical signals which are of the same sign, and with proper choice of design parameters, substantially equal. Thus, a pressure applied at some angle lying between the axial and transverse direction with respect to the axis of said stylus will produce substantially equal signals with the same amount of force supplied.

Referring now to the drawings, FIGS. 1A, 1B and 1C clearly set forth a preferred mode of the structure contemplated by the present invention. FIG. 1A is a top view of a basic pen assembly with the cover 10 removed. FIG. 1B comprises a side elevation of the pen shown in FIG. 1A. FIG. 1C is a cross-sectional view taken along line CC of FIG. 1B illustrating the cross-section configuration of the pen.

Referring to FIG. 1A the pen assembly comprises a frame or base member 12 upon which is mounted the flexible stylus 14 having a writing tip 16 at one end thereof for the obvious purpose of producing a legible signature on a writing surface provided therefor. The writing stylus 14 disclosed herein comprises a conventional ball point pen cartridge commonly constructed of steel tubing. Stylus 14 might alternatively consist of a permanent carrier-tube and a replaceable ink cartridge, such arrangements being relatively common. The stylus 14 is in turn mounted on the base 12 by two resilient members 18 and 20. Both resilient members are rigidly attached to the base member of frame 12 by an appropriate fastener such as the rivets shown. The member 18 located at the opposite end of the stylus from the writing tip is secured rigidly to the stylus as by gluing, soldering, or crimping via the side flaps 22. This is in contrast to the pivotal support means comprising the side flaps 24 and pin 26 utilized to attach resilient member 20 to the end of the stylus adjacent the writing tip. As will be described subsequently with respect to FIGS. 2 and 3, this pivotal mounting means is necessary to allow freedom of motion of the stylus body 14 with respect to the resilient member 20 when pressure forces are applied to the pen tip 16.

The sensor 28 is shown mounted on resilient member 20 close to the frame which is the area of maximum strain. The sensor is provided with leads 30 for transmitting the resultant electrical signals from the sensor to utilization circuitry connected to the pen and not shown.

The sensor 28 may be any commercially available strain gauge. The strain gauge is affixed to the resilient member 20 by means of epoxy cement or the like.

The accelerations of the pen are sensed by two cantilevered beam seismometers 32 and 34 so mounted as to sense orthogonal acceleration forces with respect to each other. Each of these seismometers consists of a mass 33 mounted upon a flexible spring 35 which is rigidly attached to the base support 12 as shown. A strain guage 36 is mounted on each resilient member 35 and may comprise a semiconductor piezoelectric resistive device for sensitivity, or a resistance foil gauge for ruggedness and low cost.

The operation of such accelerometers is well known, but stated simply, movement of the pen will cause the mass or weight 33 to deflect the resilient member 35, thus inducing an electrical signal from the strain gauge 36 which signal is appropriately connected to utilization circuity external to said pen connected over the wires provided. It will be noted then an opening 11 is provided in the upturned end of the frame member 12 which is substantially larger than the writing tip 16 of the stylus. This is necessary to insure that the stylus does not rub on the support structure during the writing operation which would cause a hysteresis effects in the pressure signal.

A mounting block 40 is shown attached to the frame member 12 at the opposite end from the writing tip, which member is utilized to hold the outer covering or casing 10 by a suitable means. It will also be understood that a similar block (not shown) would of necessity be provided at the opposite end of the frame to hold the other end of the cover 10 securely. Alternatively, the frame member could be appropriately shaped to securely interlock with the forward portion of the outer casing 10. A threaded member 42 is shown in the mounting block 40 in axial alignment with the stylus 14 having a slot therein for appropriate adjustment to limit axial movement of the writing stylus. This is merely a safety device to prevent damage to the supporting members in the event that excess axial pressure is applied to the tip of the pen as by dropping or over-enthusiastic use.

Figure 3:
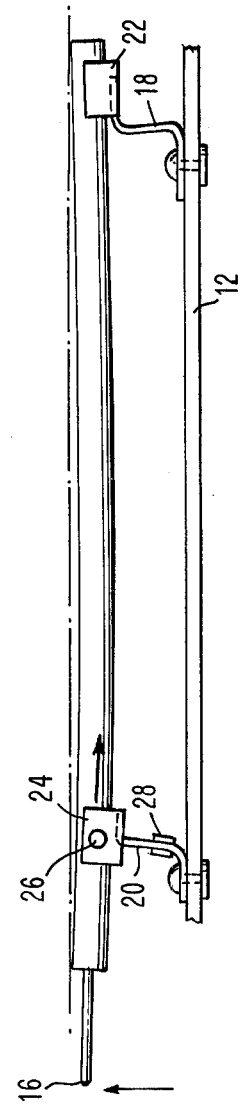
FIG. 3 is a side view of the pen similar to FIG. 2 illustrating the deformation of the stylus mounting means when a transverse pressure is applied to the tip of the writing stylus.

The operation of the device may best be appreciated by referring to FIGS. 2 and 3, which illustrate the deflections which would occur in the stylus and resilient support means with axial and transverse pressures applied to the writing tip. It will be understood that the deflections shown are exaggerated to facilitate the explanation. As stated previously, stylus assembly 14 is fixed rigidly to the rear support 18 by means of cement, spot welding, crimping, etc. The thickness of the rear support spring 18 is the same as that of the front spring 20. Also as stated previously, attachment to the front spring 20 is accomplished by means of the pin 26 which allows the cartridge to pivot at this mounting point. This pivot joint is an important and novel feature of the pen. The flexural equation of cantilever beams defines the stiffness of a fixed end versus a pivot end as a four-to-one ratio.

Thickness and dimensions of the front springs 20 and 18 may obviously be chosen to control the mechanism's sensitivity.

Referring now to FIGS. 2 and 3 the operation of the pen, and specifically the advantages obtainable with the present configuration, will be more clearly set forth and explained. FIGS. 2 and 3 illustrate in an exaggerated form the deflection effects in the support structure when an axial force or a transverse force is applied to the pen tip. The simpliest case is that of the axial force which is shown in FIG. 2. In this case the force causes the pen stylus 14 to be moved to the right. The tops of members 18 and 20 both deflect straight back in response to the axial force. Front member 20 deflects in the simple shape of a cantilevered beam due to the pivot. In contrast, rear member 18, deflects in an "S" shape, since both ends are rigidly attached.

In FIG. 3 the extreme condition of a transverse force being applied to such a pen is illustrated. As will be apparent with such a system the effect of applying a transverse force to the pen tip in essence causes the stylus assembly 14 to bend slightly, thus describing an arc as shown by the horizontal dotted line between the two supports 18 and 20. If both springs had essentially the same stiffness, the deflection between the two springs would be approximately equal since the distance between the two springs is shortened due to the bending of the stylus. However, by making the joint to the rear spring rigid the majority of the bending or deflection occurs in the front resilient member. In this case the actual deflection of the front spring is illustrated by the two dotted lines defining the angle $\theta$. Again, the front spring bends in the classical shape of a contilevered beam, while the rear spring assumes an "S" curve. It has been found by experimentation that pressure signals from the strain gauge 28 are usable for the two conditions of pressure to the pen tip, i.e., axial and transverse and have the same polarity. To a large extent, the same pressure applied to the pen tip 16 at any angle of orientation between axial and transverse will produce substantially equal output signals from the strain gauge. This is especially important in a signature verification system where different people have widely varying pen angles.

Referring again to the configuration of the front support member and especially the pivotal mounting means 24 and 26, this means allows the front support member 20 to define a simple bend regardless of the direction of pressure application. The primary force exerted on the pivot pin 26 ends up being a linear force moving to the right in the figure. This force is depicted by the arrow emanating from the pivot 26. Thus, a simple bending moment is applied to the resilient spring 20 wherein the maximum deflection occurs at the base thereof where the strain gauge 28 is located.

If on the other hand, the front member 20 were rigidly attached to the member 14 in the same way as the member 18 is attached to member 14, the front member would be forced into an "S" curve. The result of this "S" configuration, would be to make the sense of the strain for transverse forces opposite to that of axial forces. This would reduce the output of the strain gauge significantly or in some extreme cases even reverse the polarity of the output.

It may thus be seen that the presently disclosed novel stylus support structure and especially the pivotal mounting means which produces uniform stylus deflection with transverse forces provides extremely reliable and useful structure for obtaining pressure signals for use in signature verification systems or the like as described previously in the Background Art section.

Figure 4:
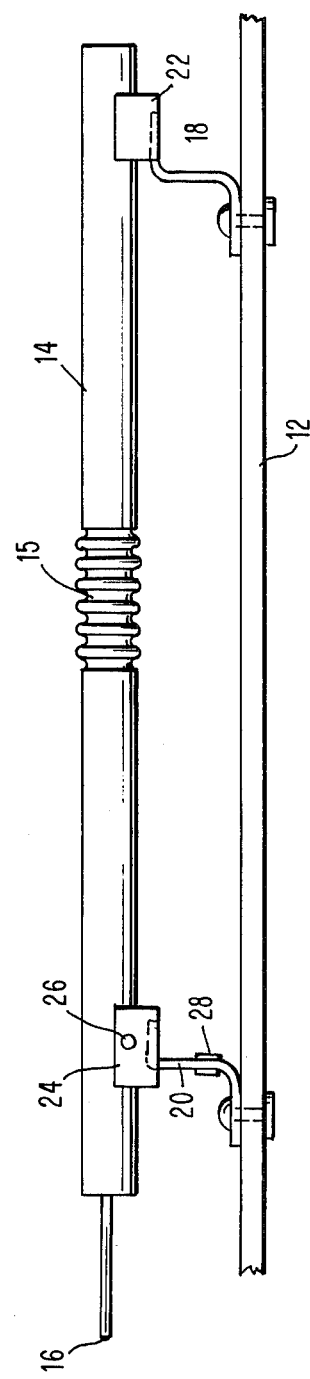
FIG. 4 is a simplified side view similar to FIGS. 2 and 3 showing an alternative embodiment of the invention.

While the presently disclosed preferred embodiment of the invention is illustrated as having a resilient stylus member 14 having in essence a distributed resilience throughout its length, other embodiments such as illustrated in FIG. 4 would be possible. In FIG. 4 all of the parts of the assembly remain the same as in FIGS. 2 and 3, however, instead of the stylus 14 having a distributed resilience it may be assumed in this figure that the stylus member 14 is essentially rigid and a resilient bellows section shown at 15 is supplied to allow bending of the stylus 14 at the approximate area of the bellows. The essential feature of the stylus 14 is that a bendable assembly be provided so long as it tends to resume its straight condition upon the removal of transverse pressure to the tip. Thus as will be apparent when the member 14 is bent there will be a shortening of the distance between the two support members 18 and 20 whether the configuration of FIGS. 2 and 3 or the configuration of FIG. 4 is utilized. It is further assumed that the resilience of the rear support member 18 will be chosen to be substantially stiffer than that of the front member 20 whereby the majority of the flexing due to a transverse force will occur in the front support member 20. This will cause a flexing of the support member near the base thereof which will produce an appropriate output from the pressure sensing element 28. Other and different structures embodying the essential concepts of the present invention will of course be obvious to those skilled in the art.

BEST MODE FOR CARRYING OUT THE INVENTION

The embodiment of the present invention as set forth and disclosed in FIGS. 1A, 1B and 1C is considered a desirable configuration. As stated previously, instead of a ball point pen and cartridge forming the stylus member 14, some other form of elongated writing implement having the necessary resiliency could conceivably be used. However, the simple and straightforward configuration shown wherein the cartridge portion is formed of plastic mounted in a steel carrier tube is readily available, inexpensive and performs very adequately.

Also, the particular resistance foil strain gauge is considered an optimal choice as the pressure transducer from the standpoint of sensitivity, reliability and economy. It will of course be appreciated that other transducers could be used such as a piezoresistive signal generating device, or one wherein capacitance varied as a function of flexure, etc. The location and disposition of the two transversely disposed accelromoters is also considered optimal.

The particular shape of the cross-section of the pen is a function of the shape of the outer casing 10. As shown in FIG. 1C, the bottom portion of the outer casing 10 is flattened and the two sides are arcuate. The purpose of this shaping is to cause the person writing his signature to hold the pen so that the axis of the pivot 26 is substantially parallel to the plane of the writing surface. As will be appreciated this will cause the transverse component of pressure applied to the tip 16 during writing to cause a simple flexing of the stylus 14 so that a simple bending of the front support 20 occurs rather than any tendency of this force to cause a twisting of the front support 20 which would result in departures from the ideal. It will be readily appreciated that other shapes of the pen, than that shown in FIG. 1C, could be utilized to encourage the pen to be held in a particular way to achieve this result.

The optimal pen configuration and the one anticipated by the present invention is one including the two accelerometers 32 and 34, specifically set forth and described herein. It will be apparent that it is not necessary to include such orthogonally disposed accelerometers in the present pen structure. It will, of course, further be obvious that such a pen could not be used in the previously referenced U.S. patent application Ser. No. 866,190 of N. M. Herbst et al., but might have utility in other and different handwriting input systems where only pressure signals are required.

An additional utilization of the present invention would be as a general pressure sensing device. Thus, for any application where it is desirable to have a signal produced regardless of whether a sensed pressure is axial or transverse and where a substantially uniform output signal is desired, the present invention would have utility.

INDUSTRIAL APPLICABILITY

The presently disclosed pen structure is believed to have primary utility in signature verification systems where a continuous accurate monitoring of the pressure component of the pen is required. More particulary, the pen is suited for use in the specific signature verification system set forth and disclosed in U.S. patent application Ser. No. 866,190 of N. M. Herbst et al., wherein the continuous pressure output of the pen is utilized in the signature verification decision as well as the continuous output of the two orthogonally disposed accelerometers. Such signature verification systems incorporating such a unique pen structure have a wide variety of security applications where personal identification is a primary requisite.

The simplicity and inherent economy of the present pen makes it ideally suited to the aforementioned applications as such a pen would, of necessity, frequently have to be left in unattended locations where they might be subjected to theft and/or malicious damage. Thus the provision of such a pen which is relatively rugged, economical to manufacture and at the same time a highly sensitive instrument renders such a signature verification system a highly practical and substantially foolproof means of personal identification.

As alluded to generally above the concepts of the present invention may be utilized in other pressure sensitive devices utilizing substantially the same structure such as for example as a general pressure probe for use in curve following devices, wherein both axial and transverse pressure might be encountered.

A further area of industrial applicability for a pressure probe assembly of this type would be in industrial robot applications where the device could serve for example as a locator on a robot arm which could sense the arrival of the arm at some destination via either axial or transverse pressure on the surface of some object.

While the invention has been particularly shown and described with reference to a preferred embodiment thereof, it will be understood by those skilled in the art that the foregoing and other changes in form and details may be made therein without departing from the spirit and scope of the invention.

Having thus described our invention, what we claim as new, and desire to secure by Letters Patent is:

1. A pressure sensing probe for producing a continuous pressure dependent signal as the probe is moved into contact with a surface, said probe comprising,
    an elongated flexible pressure sensing element having a surface engaging tip at one end thereof,
    a substantially rigid support means for carrying said pressure sensing element,
    first and second flexible mounting means for attaching said pressure sensing element to said rigid support member at opposite ends thereof,
    means for rigidly attaching the first mounting means to both the pressure sensing element and support member, means for rigidly attaching one end of the second mounting means to said support member and pivotally attaching said second mounting means to said pressure sensing element,
    the relative stiffness of said mounting means being such that the majority of flexure occurs in the second of said mounting means whenever the distance between same decrease due to flexure of said flexible pressure sensing element when a transverse force is applied to same,
    signal producing means located on said second mounting means having the greater flexibility for producing an electrical signal proportional to the degree of deflection of said mounting means.

2. A pressure sensing probe assembly as set forth in claim 1 wherein said flexible pressure sensing element and said rigid support means are substantially parallel.

3. A pressure sensing probe assembly as set forth in claim 2 wherein said second mounting means is located adjacent the surface engaging tip of said pressure sensing element and the first mounting means is located at the opposite end of said pressure sensing element, and
    wherein said signal producing means is located on said second mounting means adjacent to the point at which said second mounting means is rigidly attached to said rigid support means.

4. A pressure sensing probe assembly as set forth in claim 3 wherein said elongated flexible pressure sensing element comprises a hollow flexible tube.

5. A pressure sensing probe assembly as set forth in claim 4 wherein said elongated flexible tube comprises a carrier for a writing pen and wherein said surface engaging tip comprises the writing stylus of said pen.

6. A pressure sensing probe assembly as set forth in claim 5 wherein the elongated flexible tube comprises the ink carrier cartridge of a ball point pen assembly and the writing stylus comprises a ball point pen tip.

7. A writing instrument for producing a continuous pressure dependent signal as the instrument is moved across a writing surface, comprising,
    an elongated flexible stylus member having a writing tip at one end thereof,
    a substantially rigid support member for carrying said elongated flexible stylus member,
    first and second flexible mounting means for attaching said elongated flexible stylus member to said support member at opposite ends thereof,
    means for rigidly attaching the first mounting means to both the elongated flexible member and support member at the end opposite from said writing tip,
    means for rigidly attaching one end of the second mounting means to said support member, and means for pivotally attaching said mounting means to said elongated flexible member at the end adjacent to said writing tip,
    the relative stiffness of said mounting means being such that the majority of flexure occurs in said second mounting means whenever the distance between same decreases due to flexure of said elongated flexible stylus member when a transverse force is applied to said writing tip, and
    signal producing means located on said second mounting means for producing an electrical signal proportional to the deflection of said second mounting means.

8. A writing instrument as set forth in claim 7 including two orthogonally disposed accelerometers mounted on said support means for sensing accelerations of said writing instrument.

9. A writing instrument as set forth in claim 7 wherein said signal producing means located on said second mounting means comprises a strain gauge mounted thereon adjacent to the end of said mounting means rigidly fastened to said support means.

* * * * *